F. BRAMER.
WHEEL-HARROW.
No. 171,092. Patented Dec. 14, 1875.
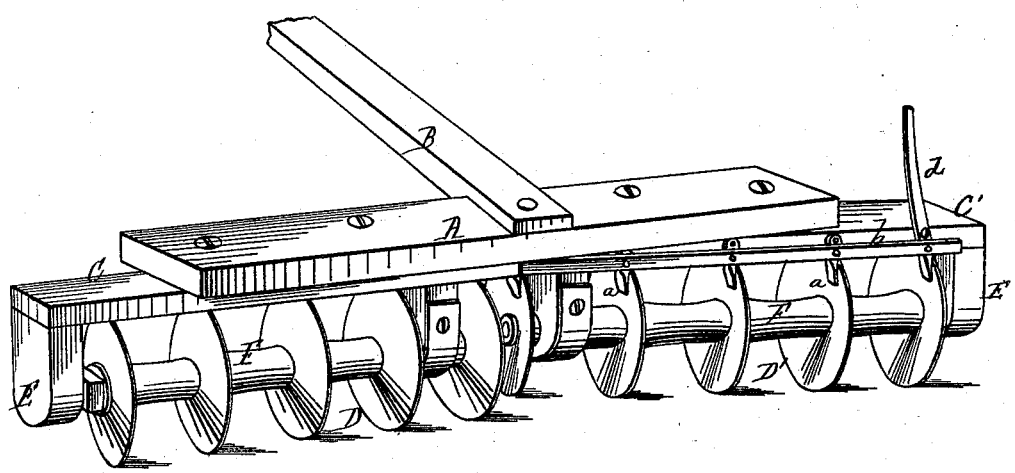
Witnesses:
Alex. Mahon
John G. Center
Inventor
Frank Bramer
by A. M. Smith
Attorney.

UNITED STATES PATENT OFFICE.

FRANK BRAMER, OF LITTLE FALLS, NEW YORK.

IMPROVEMENT IN WHEEL-HARROWS.

Specification forming part of Letters Patent No. 171,092, dated December 14, 1875; application filed October 6, 1875.

*To all whom it may concern:*

Be it known that I, FRANK BRAMER, of Little Falls, county of Herkimer, State of New York, have invented certain new and useful Improvements in Wheel-Harrows, of which the following is a full, clear, and exact description, reference being had to the accompanying drawing making part of this specification, in which—

Figure 1 represents a perspective view of so much of a wheel-harrow or wheel-harrow and seeder combined as is necessary to show my improvement.

The invention consists in the combination, with the wheels or rotating disks of a wheel-harrow or wheel-harrow and grain-drill combined, in which said wheels are mounted and made adjustable in gangs, of a series of pivoted or adjustable clearers or scrapers, united and made adjustable in gangs, corresponding in number to the number of disks in the gangs, and controlled by the driver in his seat while the machine is in operation, for cleaning the disks or wheels and increasing their efficiency.

In the accompanying drawing, A represents the main frame or frame-bar of the machine, consisting, in the present instance, of a stout transverse beam or plank, with which the draft-pole or tongue B, driver's seat, and the gang-bars C C' are connected in any usual or preferred manner. The gang bars or frames, in practice, will be pivoted or hinged to the frame or frame-bar A, and made adjustable in opposite directions relative thereto, for setting the disks or wheels at a greater or less angle to the path of the machine, according to the amount of "drag" action required, the wheels D and D' of the opposite gangs being set with opposing faces and at opposing angles, in such manner that the side draft or tendency to side movement by the wheels of one gang is opposed and counteracted by the wheels of the other gang. The gang-bars C C' are connected with the shafts of the wheels D D' by pendent arms or brackets E, and the wheels and spacing-thimbles F are mounted on said shafts in any usual manner. To the rear of the gang-bars a number of pendent clearers or scrapers, $a$ $a$, are pivoted, the number conforming to the number of harrow disks or wheels in the gang to which the clearers are applied. These scrapers are applied in close proximity with the concave faces or sides of the disks, and are pivoted each to a horizontal sliding or adjustable bar, $b$, which at one end, or at any convenient point in its length, is pivoted or linked to a lever, $d$, the upper end of which is intended to be placed within convenient reach of the driver in his seat on the machine.

By moving the upper end of the lever $d$ in or out clearers $a$ $a$ can be moved into contact with the faces of the disks, for freeing the same from any adhering clay or other obstructing or clogging matter, or away from the same when the wheels are clear and free from such obstructing matter, obviating the frictional resistance of such scrapers when they are not needed for clearing the wheels.

Having now described my invention, what I claim as new, and desire to secure by Letters Patent, is—

In combination with a gang or series of rotating harrow-disks, the clearers or scrapers united to a reciprocating bar, adapting them to be operated simultaneously by means of a lever, substantially as and for the purpose set forth.

FRANK BRAMER.

Witnesses:
    WATTS T. LOOMIS,
    SIDNEY A. LOOMIS.